(12) United States Patent
Haehnle et al.

(10) Patent No.: US 11,105,694 B2
(45) Date of Patent: Aug. 31, 2021

(54) TORQUE SENSOR HAVING A SEALING MEMBRANE

(71) Applicant: SENSODRIVE GMBH, Wessling (DE)

(72) Inventors: Matthias Haehnle, Munich (DE); Norbert Sporer, Koenigsdorf (DE); Michael Grandl, Munich (DE); Mathias Sattler, Starnberg (DE)

(73) Assignee: Sensodrive GMBH, Wessling (DE)

( * ) Notice: Subject to any disclaimer, the term of this patent is extended or adjusted under 35 U.S.C. 154(b) by 225 days.

(21) Appl. No.: 16/326,835

(22) PCT Filed: Aug. 31, 2017

(86) PCT No.: PCT/EP2017/071833
§ 371 (c)(1),
(2) Date: Feb. 20, 2019

(87) PCT Pub. No.: WO2018/041934
PCT Pub. Date: Mar. 8, 2018

(65) Prior Publication Data
US 2019/0212217 A1      Jul. 11, 2019

(30) Foreign Application Priority Data
Aug. 31, 2016   (DE) .......................... 102016010552.6

(51) Int. Cl.
*G01L 3/14* (2006.01)
(52) U.S. Cl.
CPC .......... *G01L 3/1457* (2013.01); *G01L 3/1421* (2013.01); *G01L 3/1442* (2013.01)
(58) Field of Classification Search
CPC .... G01L 3/1457; G01L 3/1421; G01L 3/1442
(Continued)

(56) References Cited

U.S. PATENT DOCUMENTS 3,526,162 A * 9/1970 Willcox ............. B28B 17/0036
  83/16
5,648,617 A * 7/1997 Cullen .................. G01L 1/2231
  73/862.042
(Continued)

FOREIGN PATENT DOCUMENTS

DE    102009014284 A1    10/2010
DE    102012000805 A1     7/2012
(Continued)

OTHER PUBLICATIONS

German language International Search Report and Written Opinion, dated Jan. 5, 2018, 10 pages.
(Continued)

*Primary Examiner* — Octavia Hollington
(74) *Attorney, Agent, or Firm* — Barnes & Thornburg LLP

(57) ABSTRACT

The invention relates to a torque sensor (1000; 1100) having a base body (1001; 1101) which extends in a radial direction (Y) of the base body from an annular inner flange (1003; 1103) having first force application points (1005; 1105), via a mechanically weakened sensor portion (1007; 1107) equipped with measurement transducers (10, 20) which generate output signals, to an annular outer flange (1009; 1109) having second force application points (1011; 1111), wherein a rubber-elastic sealing membrane (1031; 1131) arranged axially between the outer flange (1009; 1109) and the inner flange (1003; 1103) covers the mechanically weakened sensor portion (1007; 1107) in a fluid-tight manner.

10 Claims, 7 Drawing Sheets

(58) Field of Classification Search
USPC .................................................. 73/862.338
See application file for complete search history.

(56) References Cited

U.S. PATENT DOCUMENTS

| | | |
|---|---|---|
| 8,250,935 B2 | 8/2012 | Meuter |
| 9,003,896 B2 | 4/2015 | Nold et al. |
| 10,739,216 B2 * | 8/2020 | Haehnle ................ G01L 3/1457 |
| 2011/0041625 A1 | 2/2011 | Meuter |

FOREIGN PATENT DOCUMENTS

| | | | |
|---|---|---|---|
| DE | 102013012973 A1 * | 2/2015 | ............. G01L 3/108 |
| EP | 1353159 A2 | 10/2003 | |
| WO | 2010108674 A1 | 9/2010 | |

OTHER PUBLICATIONS

English language translation of International Search Report, dated Jan. 5, 2018, 2 pages.
German language International Preliminary Report on Patentability, dated Sep. 9, 2017, 12 pages.
German language Search Results, dated Jun. 19, 2017, 3 pages.
English Translation of International Search Report and Written Opinion, dated Jan. 5, 2018, 5 pages.
English Machine Tranlsation of International Preliminary Report on Patentability, dated Sep. 7, 2018, 4 pages.
English Machine Translation of Wuesthoff's Response to Further Prosecution, Aug. 3, 2018, 6 pages.

* cited by examiner

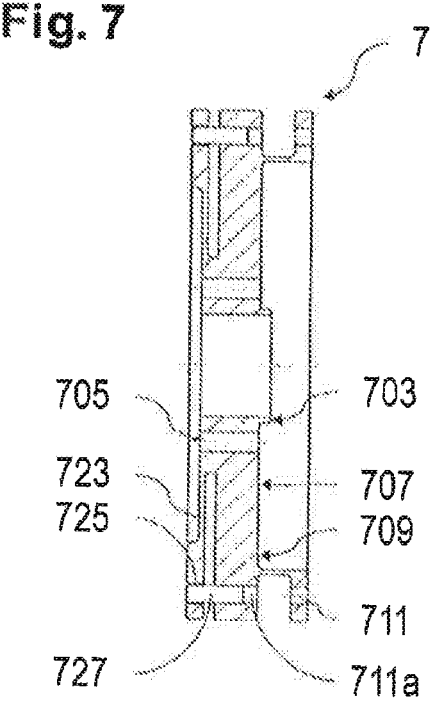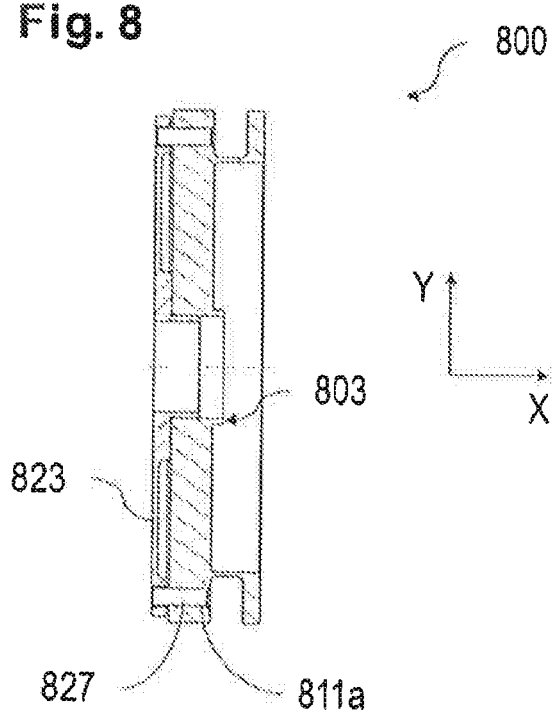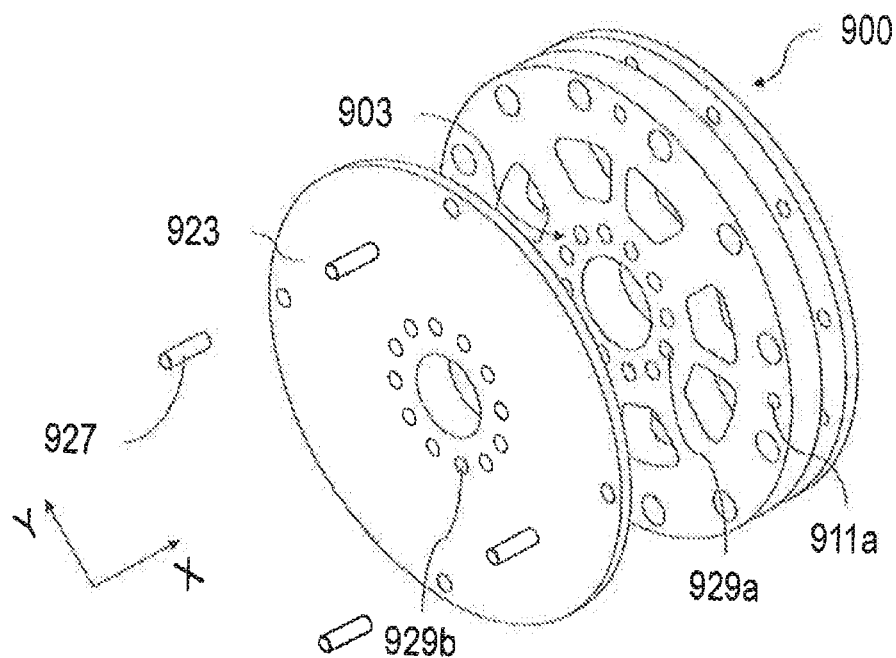

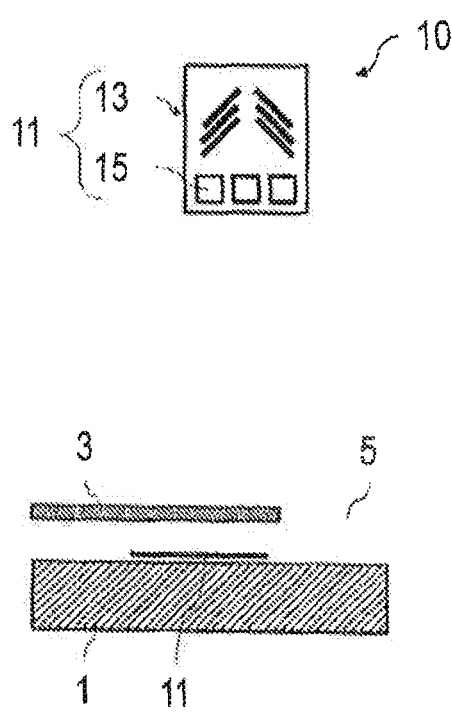
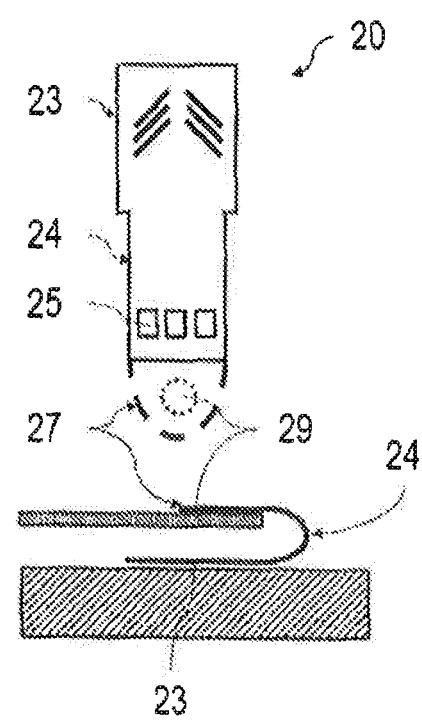

TORQUE SENSOR HAVING A SEALING MEMBRANE

CROSS REFERENCE TO RELATED APPLICATIONS

This is a national stage entry of International Patent Application No. PCT/EP2017/071833, filed Aug. 31, 2017, which claims the benefit of and priority to German Patent Application No. 10 2016 010 552.6, filed Aug. 31, 2016, the disclosures of which are both expressly incorporated herein by reference in their entireties.

FIELD OF THE INVENTION

The invention relates to a torque sensor.

BACKGROUND

A torque sensor in the form of a monolithic receiving component is known from document EP 1 353 159 A2.

SUMMARY

The object underlying the invention is to provide a compact torque sensor of simple construction which is less sensitive to mechanical interference.

The object is achieved according to the invention by a torque sensor having the features mentioned in the appended claims.

Such a torque sensor has a base body which extends in a radial direction of the base body from an annular inner flange having first force application points, via a mechanically weakened sensor portion equipped with measurement transducers which generate output signals, to an annular outer flange having second force application points, wherein a rubber-elastic sealing membrane arranged axially between the outer flange and the inner flange covers the mechanically weakened sensor portion in a fluid-tight manner. This prevents, for example, fluid from being able to pass through a sensor portion provided with axial through-openings for mechanical weakening.

Preferably, the rubber-elastic sealing membrane is located axially between the second force application points and the mechanically weakened sensor portion. In this manner, the measurement transducers, or strain gauges, can reliably be protected against contact with fluid and, where present, a gear can be sealed.

The sealing membrane can be clamped to the torque sensor or adhesively bonded thereto.

Preferably, the sealing membrane is in the form of a disk-shaped annular membrane, whereby it can easily be introduced between the outer and inner flange.

Preferably, the sealing membrane is attached to the outer and/or inner flange.

Preferably, the sealing membrane is a molded rubber part, a turned rubber part, or a rubber part produced by means of water-jet machining.

Preferably, the sealing membrane has a modulus of elasticity which is lower than that of the base body by at least a factor of $10^2$, preferably a modulus of elasticity which is lower by a factor of from $10^3$ to $10^5$, preferably a modulus of elasticity which is lower by a factor of from $10^4$ to $10^5$. Owing to the lower modulus of elasticity of the sealing membrane, the influence thereof on the deformation in the sensor portion is reduced still further.

Preferably, the second force application points are connected to the sensor portion by a radially elastic material portion. In this manner, a high degree of decoupling can be achieved in the radial direction, so that, for example, it is possible to compensate for roundness deviations at the second force application points. Such roundness deviations can be caused, for example, by manufacturing tolerances. The consequence can be crosstalk of the measurement transducers. In order to avoid measuring errors caused thereby, the radially elastic material portion has low stiffness in respect of radial deformations, in order to compensate for axial forces and tilting moment, whereas it is virtually rigid in respect of torsional forces, that is to say has high stiffness. The radially elastic material portion can be so configured that deformations from axial forces and tilting moments are compensated for.

The radially elastic material portion can be a thin-walled material portion extending in the axial direction of the base body. The material portion does not have to extend solely in the axial direction but may also merely have an axial component. For example, such an axial material portion can be in conical or meandering form. Preferably, this thin-wailed material portion is a portion extending only in the axial direction of the base body, that is to say a material portion extending solely in the axial direction.

Suitable as the measurement transducers are, for example, pressure- or tension-sensitive measurement transducers, for example strain gauges, but it is also possible to measure the angle difference between the inner flange and the outer flange of the torque sensor by means of an encoder. It is further also possible to use a magnetostrictive measuring method.

Preferably, the outer flange is monolithic or multi-part, wherein the radially elastic material portion and the second force application points preferably form one part.

Preferably, the thin-walled material portion is in the form of a thin-walled bottom of a groove extending in the outer flange in the circumferential direction. Preferably, the groove is located at the outer circumference or at the inner circumference of the outer flange. Overall, a compact construction of the torque sensor which is simple to manufacture is thus made possible.

The force application points can be bores or tooth spaces or a combination of the two, wherein the bores and/or the teeth forming the tooth spaces preferably extend in an axial direction of the base body. Here and hereinbelow, bores mean openings that are open on at least one side, for example openings with a circular or polygonal cross-section.

Preferably, the radially elastic material portion connects second force application points which are each in the form of a bore with third force application points, located on the outer flange and likewise each in the form of a bore, which, in an unstressed basic state of the torque sensor, are concentric. Such concentric second and third force application points can be manufactured in a simple manner by a drilling process.

In a third force application point in the form of a bore, which is located in the outer flange of the sensor (non-radially elastic material portion), there can be fixed a stop element, preferably in the form of a stop pin, which extends in the axial direction of the bore and, in the unstressed basic state of the torque sensor, is circumferentially surrounded, in a contactless manner, by a fourth force application point, likewise in the form of a bore. It is thereby possible in particular to avoid overloading of the mechanically weakened sensor portion, because the stop element is then in contact with the wall of the fourth force application point in the form of a bore and, by being supported in that manner, provides additional stiffening in the torque sensor. Preferably, the shape of the stop element is complementary to that of the third force application point, whereby the stop element can also be in the form of a hollow body.

Preferably, third force application points in the form of bores have a different diameter to second force application points in the form of bores. This has the advantage that there can be used as the stop element, for example, a stop pin with a constant diameter, wherein the diameter thereof must correspond to the smaller diameter of the second and third force application points in the form of bores in order to be able to be surrounded in a contactless manner by the respective other of the second and third force application points in the form of bores.

Preferably, third force application points in the form of bores have a larger diameter than second force application points likewise in the form of bores. Advantageously, it is thus possible to check, from the end of a third force application point in the form of a through-bore that is remote from the second force application point, whether the one end of the stop element is actually surrounded in a contactless manner by the third force application point. The other end of the stop element, on the other hand, is fixed in the second force application point in the form of a bore and is not visible in the mounted state of the torque sensor.

Preferably, the second force application points are part of a portion which protrudes radially from the outer flange and from which the radially elastic material portion extends in the axial direction of the base body to the sensor portion. Simple mounting access to the second force application points is thus possible.

The outer flange can be monolithic, wherein the torque sensor can consist of steel, aluminum or an aluminum alloy.

Alternatively, the outer flange can be multi-part, wherein the radially elastic material portion and the second force application points preferably form a common part, which is preferably made of steel, while the other part of the outer flange can consist of aluminum or an aluminum alloy. This multi-part form makes it possible to choose a suitable material for each part. Thus, it is advantageous to manufacture the radially elastic part of the torque sensor from steel and the remaining part of the torque sensor from aluminum or an aluminum alloy, because the last-mentioned two materials do not have hysteresis and have low internal damping while having high strength. In the case of a torque sensor in monolithic form, it is therefore likewise advantageous to choose aluminum or an aluminum alloy as the material.

Preferably, the radially elastic material portion and the second force application points form a part which is releasably connected to the remainder of the outer flange, preferably by means of screws. In this manner, an outer flange part can be replaced quickly and inexpensively.

Preferably, the second force application points are monolithically formed with a housing, which can simplify production.

Preferably, the measurement transducers are strain gauges, the working principle of which can be electrical, optical or piezoelectric.

The mechanically weakened sensor portion can comprise radially extending first and second connecting webs, which have the same or different mechanical properties and are arranged alternately in the circumferential direction. "Radially extending" here means any profile of the mechanically weakened sensor portion that comprises at least one radial component. The radial profile can be exclusively radial, but profiles deviating therefrom with radial components are readily possible, for example a meandering profile.

Preferably, the connecting webs are adapted for measuring shear and/or bending stresses.

Preferably, if the first connecting webs differ mechanically from the second connecting webs, strain gauges serving as measurement transducers are attached only to the first connecting webs or to both connecting webs. With the second alternative, the measuring range can be enlarged. In principle, by configuring the first and second connecting webs to be mechanically different, the surface strain measured by a strain gauge can differ despite the mechanical load being the same, that is to say in the present case with the same effective torque. Therefore, when mechanically different first and second connecting webs are present, the first connecting webs, for example, can be in such a form that strain gauges fixed thereto generate a relatively high wanted electrical signal even at low effective torques. With connecting webs in such a form, low torques can be measured with better resolution, but the measuring range is then also correspondingly smaller. In the chosen example, the second connecting webs can then be in such a form that strain gauges fixed thereto deliver good wanted electrical signals only at higher torques, which is advantageous for measuring higher torques. The measuring range of the strain gauges fixed to the second connecting webs is then also correspondingly larger.

A stop flange, which is connected in a rotationally secure manner only to the inner flange and has at least one stop flange bore which is concentric with an axial outer flange bore in an unstressed basic state of the torque sensor, can extend parallel to the sensor portion on a side of the outer flange opposite the second force application points. In this manner, a stiffening possibility by means of one or more stop pins can be added as required in the event of overloading at the torque sensor. The mode of functioning corresponds to that described above in relation to the stop pins.

Preferably, the stop flange bore has a diameter which is different from that of the outer flange bore, wherein the bore having the smaller diameter can fix the stop pin. In this manner, as already mentioned above, one end of a stop pin having a constant diameter can be fixed either in the outer flange bore or in the stop flange bore, while the other end of the stop pin is surrounded in a contactless manner by the respective other of the outer flange bore or the stop flange bore in an unstressed basic state of the torque sensor.

Preferably, there are present in the stop flange a plurality of stop flange bores distributed equidistantly in the circumferential direction of the outer flange, which can lead to better load distribution in the circumferential direction in the event of overloading.

Preferably, the stop flange has stop flange bores located opposite one another at an equal distance in relation to a line through the central axis of the inner flange, which can lead to better load distribution in the radial direction in the event of overloading.

Preferably, a stop pin extending in the axial direction is fixed in either the outer flange bore or the stop flange bore and, in the unstressed basic state of the torque sensor, is circumferentially surrounded, in a contactless manner, by the opposite respective other of the outer flange bore or the stop flange bore.

By means of the above measures, breakage protection by overload can be provided simply and compactly in the torque sensor, so that plastic deformation of the torque sensor can also be avoided. The axial bores provided here are simpler to manufacture than radial bores. Furthermore, the gap between the stop pin and the corresponding stop flange bore or the outer flange bore can be chosen to be smaller than in the case of a radial orientation of the stop pin, see in this connection FIGS. 6a, 6b and 7a, 7b in EP 1 353 159 A2. In addition, a radially extending stop pin is more sensitive to axial deformations and tilting moments at the torque sensor.

The stop flange can be monolithically formed with the inner flange, which can permit a simple and compact construction.

Alternatively, the stop flange can be a component which is connected to the inner flange, preferably a component which is releasably connected to the inner flange. In this manner, a stiffer material can be chosen for the stop flange than for the base body of the torque sensor and in particular the sensor portion.

Preferably, the stop flange can be a component which is connected to the inner flange by an interference fit.

Preferably, the stop flange can be a component which is releasably connected to the inner flange by screws extending parallel to the axial direction of the base body. Alternatively, the stop flange can be connected to the inner flange by means of an adhesive connection, an adhesive connection and screws, or an interference fit and screws, or in another way.

The measurement transducers can be strain gauges which have a measurement grid portion connected to the base body and a free connecting portion, adjoining the measurement grid portion, having at least one electrical connection point. In this manner, the strain gauges can quickly and easily be attached at one end to a surface and at their other end to an electrical component.

Preferably, the at least one electrical connection point is a solder pad.

Preferably, the minimum distance between the electrical connection point and the measurement grid portion corresponds to the length of the measurement grid portion in its longitudinal direction, which facilitates handling of the strain gauge for attachment purposes.

Preferably, the connecting portion is elastic and/or strip-shaped.

Preferably, the connecting portion is bent in a preferential direction in an unstressed basic state, for example bent into a U-shape.

A holding portion, which is designed for temporarily holding the connecting portion on an electrical component, can adjoin the connecting portion on the other side of the at least one electrical connection point. The attachment of the other end of the strain gauge to an electrical component is thereby facilitated.

Preferably, the holding portion has a central through-bore or indentation. This can serve for temporarily holding the holding portion on an electrical component, for example by means of a screwdriver.

Preferably, the holding portion is self-adhesive. In this case, the holding portion could be temporarily held on an electrical component without a tool.

Preferably, the holding portion is rounded, which can prevent injury during handling thereof.

BRIEF DESCRIPTION OF THE FIGURES

The invention will be explained in greater detail below by means of schematic drawings. Similar elements are thereby provided with similar reference numerals, whereby, in order to improve the legibility of the drawings, such reference numerals have in some cases been omitted. In the drawings:

FIG. 7 is a cross-sectional view of a seventh torque sensor which is monolithically formed with a stop flange, FIG. 8 is a cross-sectional view of an eighth torque sensor having a stop flange that is a component connected separately, by an interference fit, to the torque sensor, FIG. 9 is a perspective exploded oblique bottom view of a ninth torque sensor, similar to the eighth torque sensor of FIG. 8, in which the stop flange is connected to the torque sensor by a screw connection.

DETAILED DESCRIPTION

Figure 1:
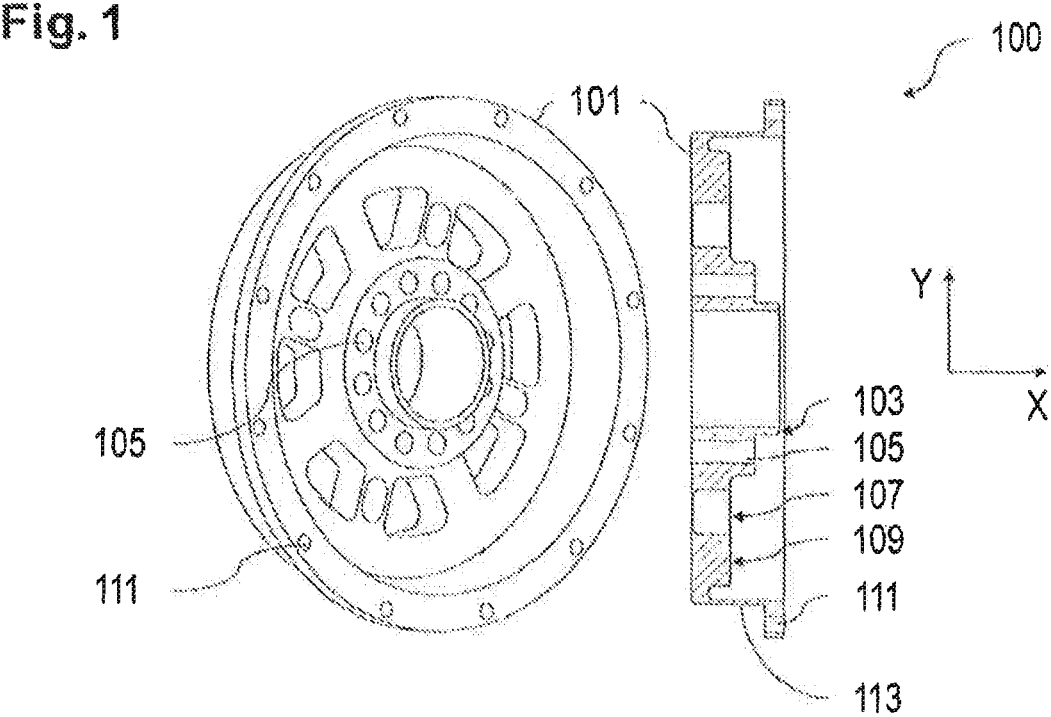
FIG. 1 left—is a perspective oblique top view of a first torque sensor, and right—is a cross-sectional view of the first, monolithic torque sensor, FIG. 2 right—is a perspective oblique bottom view of a second torque sensor, and left—is a cross-sectional view of the second, monolithic torque sensor, FIG. 3 right—is a perspective oblique bottom view of a third torque sensor, and left—is a cross-sectional view of the third, two-part torque sensor, FIG. 4 right—is a perspective oblique bottom view of a fourth torque sensor, and left—is a cross-sectional view of the fourth, two-part torque sensor.

FIG. 1 shows a first torque sensor 100 in monolithic form, having a base body 101 made of aluminum or an aluminum alloy which extends in a radial direction Y of the base body 101 from an annular inner flange 103 having first force application points 105, each in the form of a bore, via a mechanically weakened sensor portion 107 equipped with strain-sensitive measurement transducers which generate electrical output signals, see for example FIGS. 14 and 15, to an annular, monolithic outer flange 109. In a portion protruding radially from the outer flange 109 there are second force application points 111 each in the form of a bore, these second force application points 111 being connected in an axial direction X of the base body 101 to the sensor portion 107 via a radially elastic material portion 113 which extends in the axial direction X and is in the form of a thin-wailed circumferential wall portion.

Figure 2:
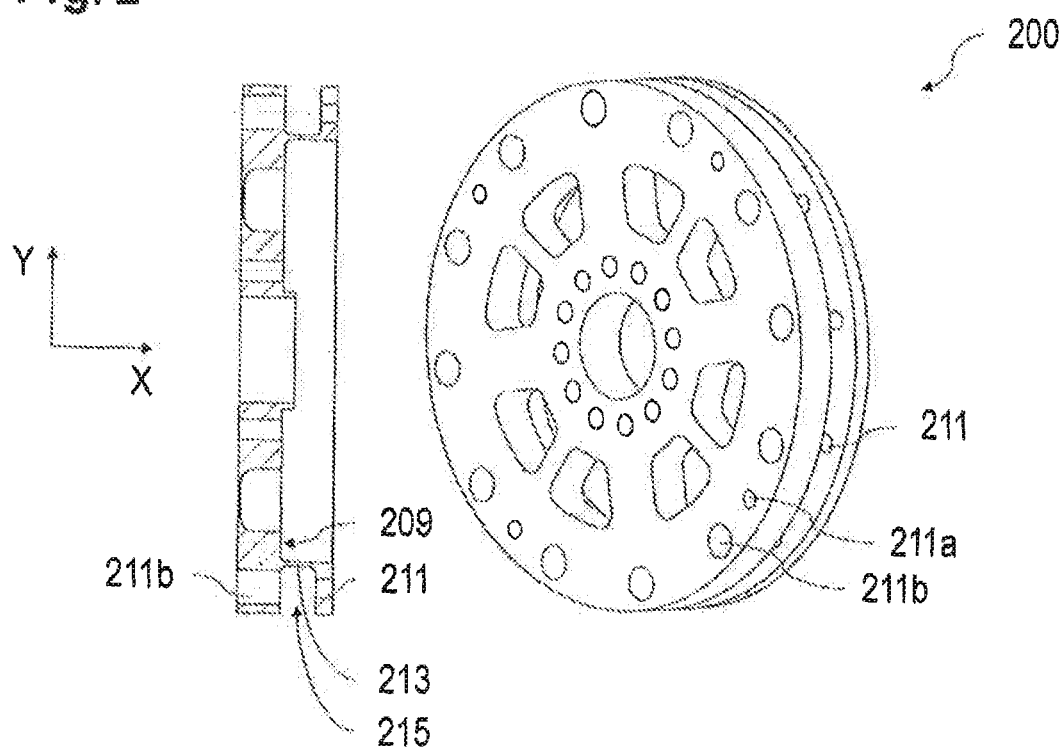

FIG. 2 shows a second torque sensor 200, likewise in monolithic form, in which the radially elastic material portion 213 is in the form of a thin-walled bottom of a groove 215 running around the outer circumference of the outer flange 209. The radially elastic material portion 213 connects the second force application points 211 to third force application points 211a which are located on the outer flange 209 and are each in the form of a bore, and also to fourth force application points 211b, likewise in the form of bores, which here serve as access openings. The access openings 211b, in an unstressed basic state of the torque sensor 200, are arranged concentrically with the second force application points 211. However, it is also possible, as is described hereinbelow with reference to FIGS. 7 to 9, for an access opening 211b also to serve as a force application point. For that purpose, a stop element can be fixed in one of the force application points 211, 211b, which stop element extends in the axial direction X and, in the unstressed basic state of the torque sensor 200, is circumferentially surrounded, in a contactless manner, by the respective other force application point 211b, 211. In the exemplary embodiment shown, the access openings 211b have a larger diameter than the second force application points 211. Of course, the access openings 211b can additionally or solely be used for allowing connecting elements, for example screws or bolts, to pass to the second force application points 211 in order to permit those connecting elements for attachment of a component, for example a sleeve or a housing, to the second force application points 211.

Figure 3:
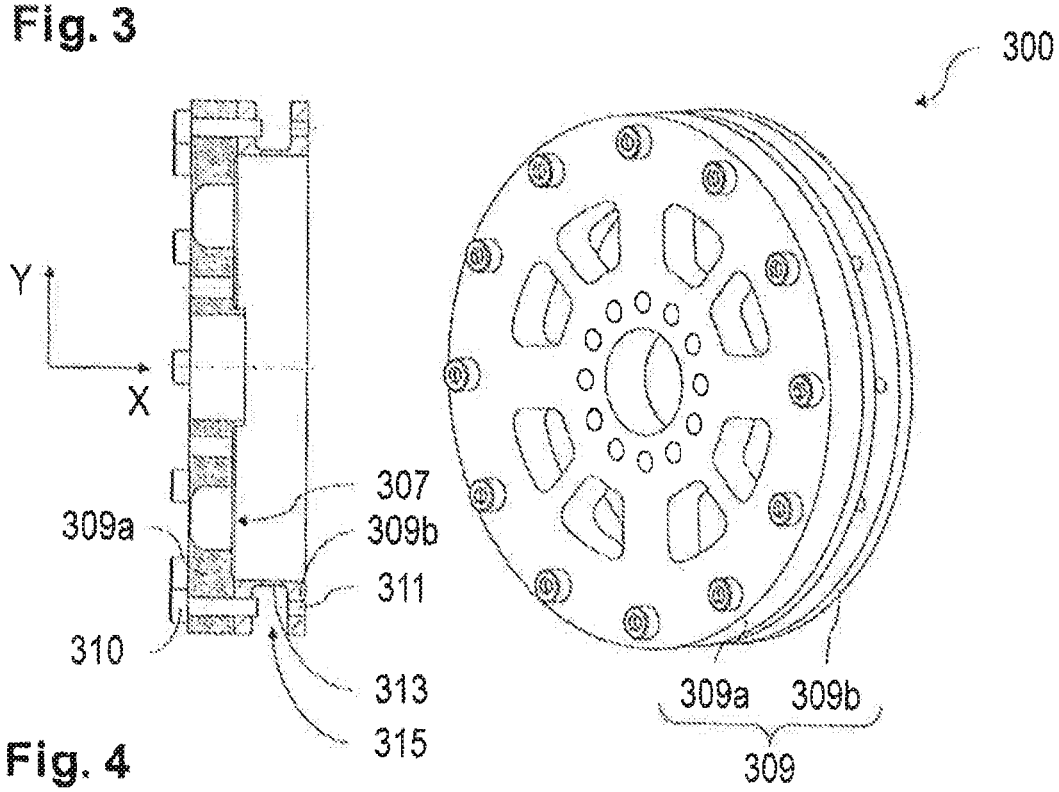

FIG. 3 shows a third torque sensor 300 having an outer flange 309 which, in contrast to FIGS. 1 and 2, is in multi-part form. A first part 309a, made of aluminum or an aluminum alloy, of the multi-part outer flange 309 extends monolithically as a prolongation of the sensor portion 307, while a second part 309b made of steel comprises the radially elastic material portion 313 and the second force application points 311. The second part 309b is releasably connected to the first part 309a by screws 310 extending parallel to the axial direction X.

Figure 4:
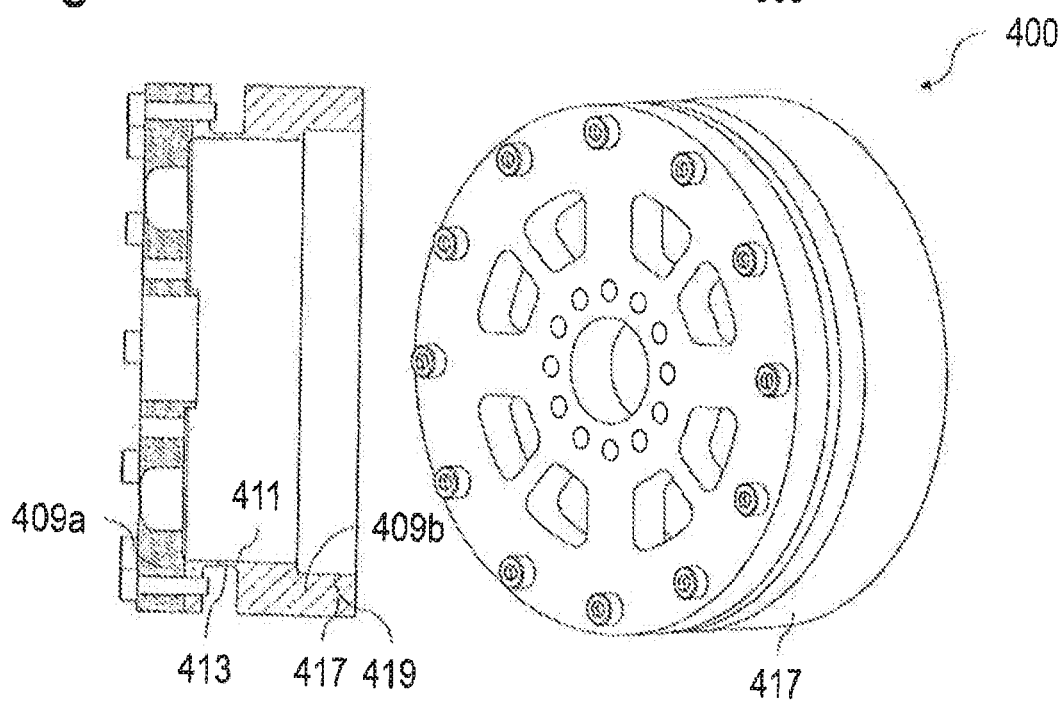

FIG. 4 shows a fourth torque sensor 400, which differs from the third torque sensor 300 shown in FIG. 3 substantially in that its second force application points 411 are monolithically formed with a housing 417 which has a bearing seat 419 facing towards the central axis of the torque sensor 400.

Figure 5:
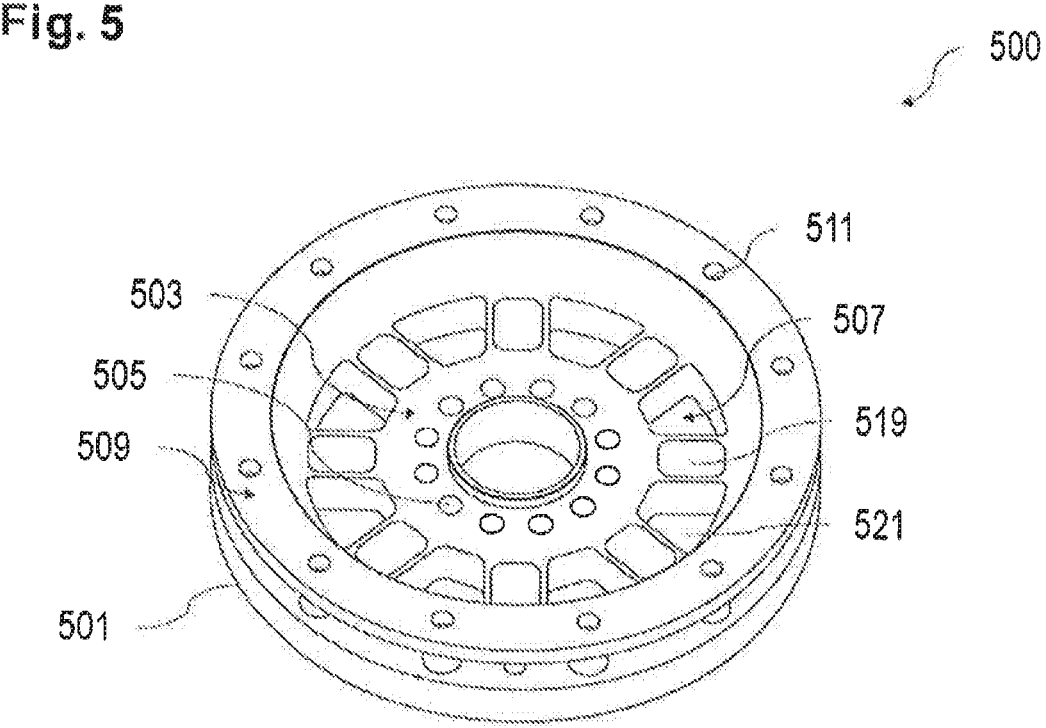
FIG. 5 is a perspective view of a fifth torque sensor with identical connecting webs.

FIG. 5 shows a fifth torque sensor 500 in which the annular, mechanically weakened sensor portion 507 is formed by radially extending connecting webs 519 which all have the same mechanical properties and are spaced apart from one another in the circumferential direction by cutouts 521. The connecting webs 519 are adapted for measuring shear and/or bending stresses, and measurement transducers in the form of strain gauges are attached to all the connecting webs 519. Measurement transducers of a first sensitivity and measurement transducers of a second sensitivity can thereby be attached alternately in the circumferential direction. Likewise, measurement transducers can be attached alternately at different points of the connecting webs 519.

Figure 6:
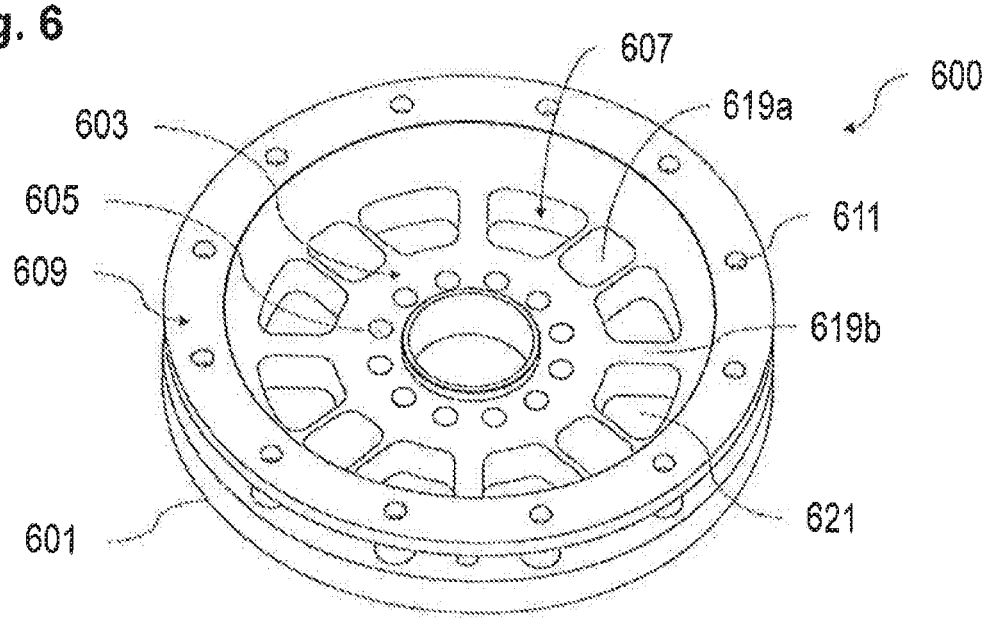
FIG. 6 is a perspective view of a sixth torque sensor with different connecting webs arranged alternately.

FIG. 6 shows a sixth torque sensor 600 in which the annular, mechanically weakened sensor portion 607, in contrast to the fifth torque sensor 500 shown in FIG. 5, has radially extending first and second connecting webs 619a, 619b, the first connecting webs 619a having different mechanical properties to the second connecting webs 619b and being arranged alternately in the circumferential direction with cutouts 621 located between them. Measurement transducers are here attached to both connecting webs 619a, 619b. Alternatively, the measurement transducers can also be attached only to the first or second connecting webs 619a, 619b. The first measurement transducers attached to the first connecting webs 619a only deliver signals of a first measuring range, and the second measurement transducers attached to the second connecting webs 619b only deliver signals of a second measuring range, the measuring ranges being different from one another. One measuring range can lie within the other.

The connecting webs 519, 619a can be formed corresponding to the connecting webs 14 with the measurement transducers 61 attached thereto, as described in paragraphs [0043] to [0052] of EP 1 353 159 A2. Likewise, the connecting webs 619b can be in solid form or also formed corresponding to the connecting webs 24 or 24' with the measurement transducers 61 attached thereto, as described in paragraphs [0055] to [0057] of EP 1 353 159 A2. The same also applies to all the other torque sensors having connecting webs described herein.

FIG. 7 shows a seventh torque sensor 700, which differs from the second torque sensor 200 shown in FIG. 2 substantially in that it is monolithically formed with a stop flange 723 which extends parallel to the sensor portion 707 on a side of the outer flange 709 opposite the second force application points 711. The stop flange 723 is connected in a rotationally secure manner only to the inner flange 703 and has a plurality of stop flange bores 725 (fourth force application points) which, in an unstressed basic state of the torque sensor 700, are concentric with the axial outer flange bores 711 and the third outer flange bores 711a. The stop flange bores 725 have a larger diameter than the outer flange bores 711 and 711a and are located opposite one another both equidistantly in the circumferential direction and at the same distance with respect to a line in the radial direction Y through the central axis of the inner flange 703. The stop elements 727 in the form of stop pins are fixed in the third outer flange bores 711a and extend in the axial direction X, wherein, in the unstressed basic state of the torque sensor 700, they are circumferentially surrounded, in a contactless manner, by the stop flange bores 725. It is possible for either the stop flange bores 725 or the third outer flange bores 711a, as shown here, to be in the form of through-bores or alternatively in the form of blind holes. In the case of overloading of the sensor portion 707, the stop pin 727 contacts the inside of the corresponding stop flange bore 725 and is supported there, in order to relieve the sensor portion 707.

FIG. 8 shows an eighth torque sensor 800, which differs from the seventh torque sensor 700 shown in FIG. 7 substantially in that its stop flange 823 is not monolithically formed with the inner flange 803 but is a separate component releasably connected to the inner flange 803. The stop flange 823 is connected to the inner flange 803 by an interference fit.

FIG. 9 shows a ninth torque sensor 900, which differs from the eighth torque sensor 800 shown in FIG. 8 substantially in that its stop flange 923 is connected to the inner flange 903 not by an interference fit but by screws (not shown) extending parallel to the axial direction X. For that purpose, corresponding complementary bores 929a, 929b are present on the inner flange 903 and on the stop flange 923.

Figure 10:
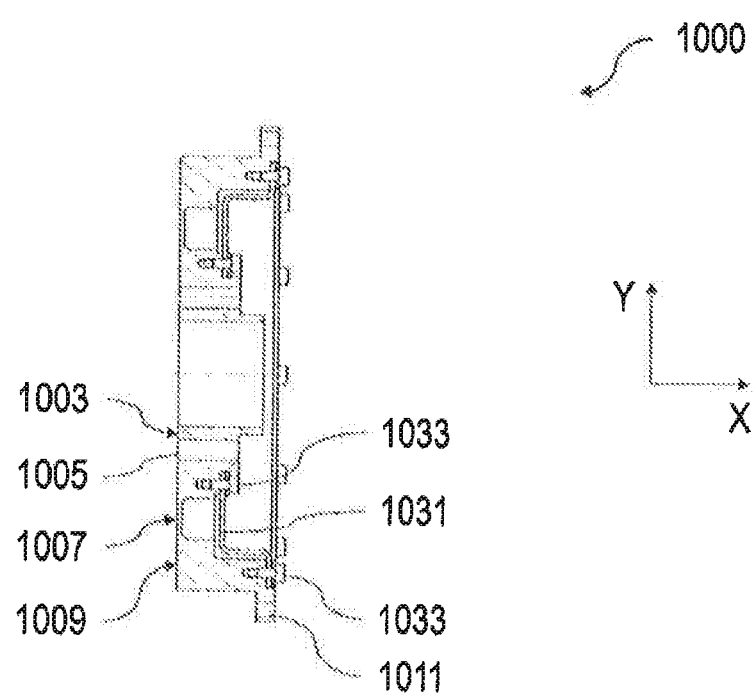
FIG. 10 is a cross-sectional view of a tenth torque sensor with a clamped sealing membrane.

FIG. 10 shows a tenth torque sensor 1000 which has a rubber-elastic sealing membrane 1031 for covering the mechanically weakened sensor portion 1007 on the torque sensor 1000 on one side in a fluid-tight manner. The sealing membrane 1031 is clamped annularly between the inner flange 1003 and the outer flange 1009 by means of screws 1033. Clamping to only one of the inner flange 1003 and the outer flange 1009 may be sufficient. The representation shown here is merely intended to illustrate that it is also possible only to attach the sealing membrane 1031 to conventional torque sensors, as known, for example, from EP 1 353 159 A2. By correspondingly prolonging the outer flange 1009 in the axial direction X beyond the screws 1033, the above-described radially elastic material portion 1013 can readily be provided, the second force application points 1011 being located at the end of such a prolongation.

Figure 11:
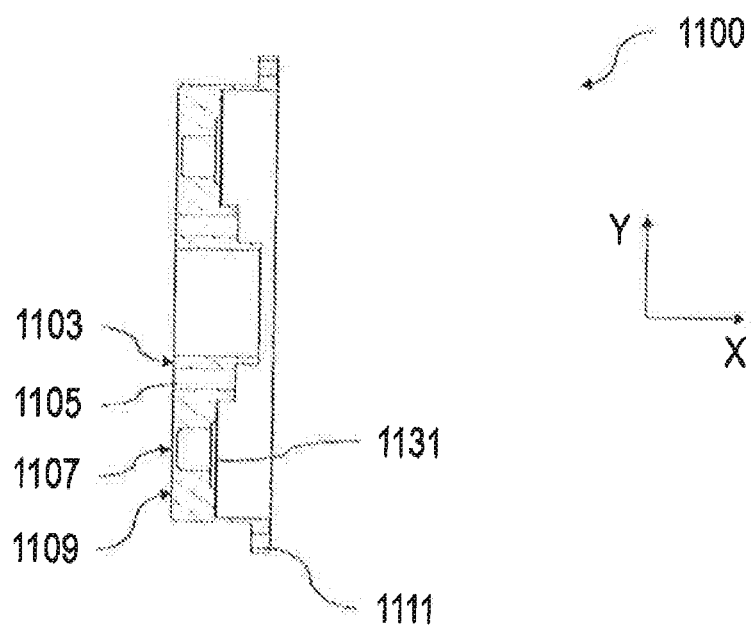
FIG. 11 is a cross-sectional view of an eleventh torque sensor with a sealing membrane adhesively bonded therein.

FIG. 11 shows an eleventh torque sensor 1100, which differs from the tenth torque sensor 1000 shown in FIG. 10 substantially in that its sealing membrane 1131 is adhesively bonded to the torque sensor 1000 annularly between the inner flange 1103 and the outer flange 1109.

The sealing membrane 1031, 1131 of the tenth or eleventh torque sensor 1000, 1100 can be a molded rubber part, a turned rubber part, or a rubber part produced by water-jet cutting, a combination of damping and adhesive bonding likewise being possible for fixing. The sealing membrane 1031, 1131 has a modulus of elasticity which is lower than that of the base body 1001, 1101 by at least a factor of $10^2$, preferably a modulus of elasticity which is lower by a factor of from $10^2$ to $10^4$, preferably a modulus of elasticity which is lower by a factor of from $10^4$ to $10^5$. The lower the modulus of elasticity of the sealing membrane in comparison with the base body, the less the sealing membrane falsifies the measurement result of the torque sensor.

Figure 12:
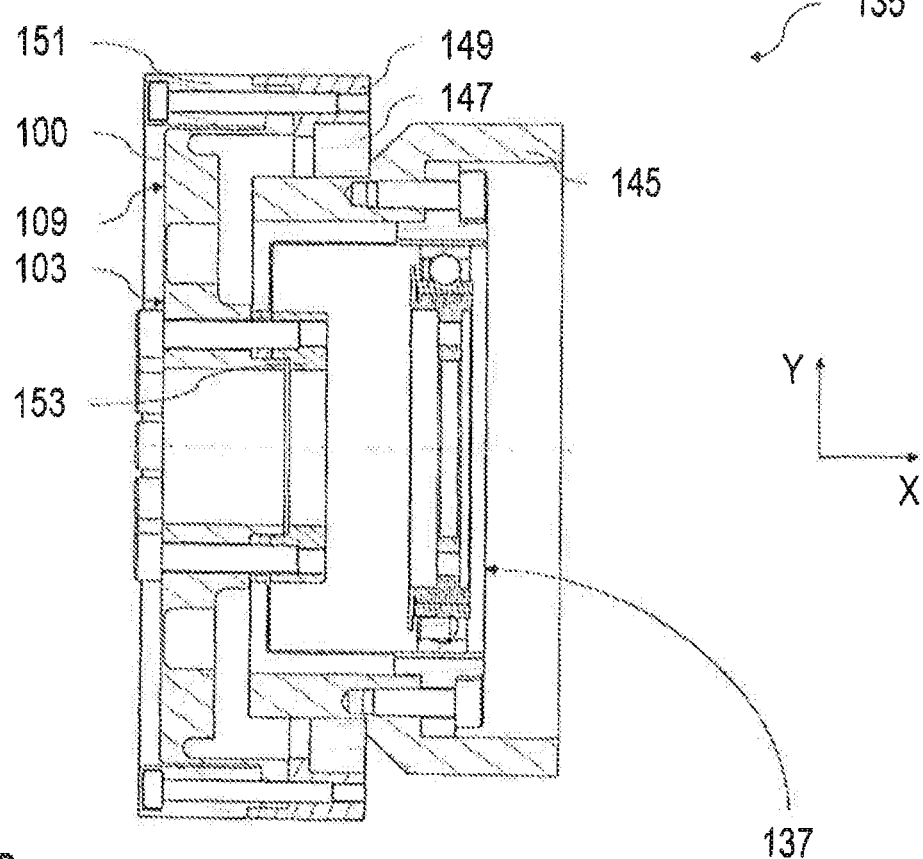
FIG. 12 is a cross-sectional view of the first torque sensor of FIG. 1 in a lightweight arrangement together with a Harmonic Drive gear.
Figure 13:
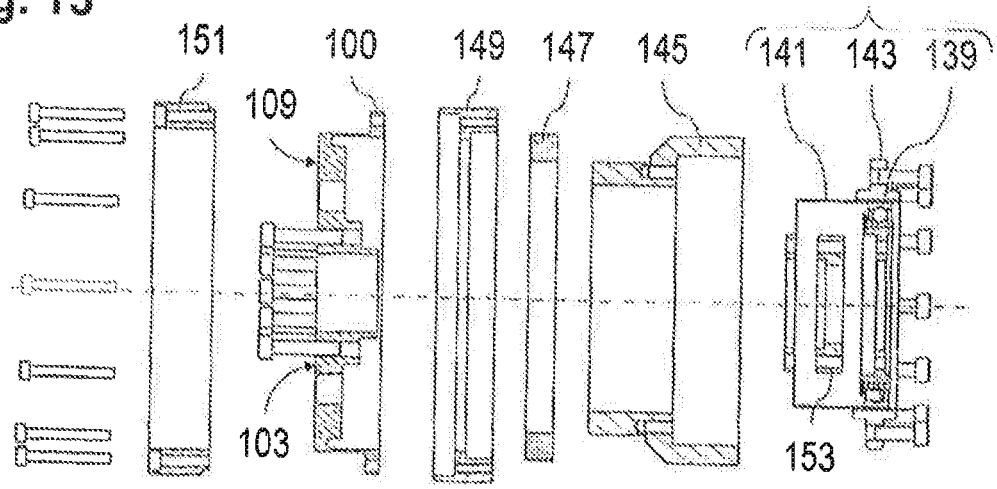
FIG. 13 is an exploded view of the lightweight arrangement of FIG. 12, FIG. 14 top—shows a conventional strain gauge, and bottom—shows a conventional fixing of the strain gauge, and FIG. 15 top—shows an alternative strain gauge, and bottom—shows a fixing of the alternative strain gauge.

FIG. 12 and FIG. 13 show the first torque sensor 100 of FIG. 1 in a lightweight arrangement 135 with a Harmonic Drive gear 137 which, from the inside outwards, has a wave generator 139, a flexspline 141 and a circular spline 143. The circular spline 143 is screwed to a housing 145, which in turn is mounted via a crossed roller bearing 147 on an output housing 149. The outer flange 109 of the torque sensor 100 is screwed to the output housing 149 by means of an output flange 151. The inner flange 103 of the torque sensor 100 is in turn screwed to the flexspline 141 via a threaded ring 153.

FIG. 14 shows a conventional strain gauge 10, which is to be understood as being a measurement transducer designated above. The strain gauge 10 has a strip-shaped base body 11 with a measurement grid portion 13 at one end and an electrical connection point in the form of a solder pad 15 at an opposite, other end. In order electrically to connect this strain gauge 10, which can be fixed as a whole to a component 1, to an electrical component 3, lines 5 must first be soldered to the solder pad 15 and then to the electrical component 3.

FIG. 15 shows an alternative strain gauge 20, which differs from the conventional strain gauge 10 shown in FIG. 14 substantially in that it can be fixed to the component 1 only by its measurement grid portion 23 and in that, instead of separate lines 5, the strain gauge 20 has a connecting portion 24 adjoining the measurement grid portion 23, which connecting portion has the solder pad 25 at its end opposite the measurement grid portion 23 and the length of which corresponds at least to the measurement grid portion 23. The connecting portion 24 is strip-shaped and flexible, whereby it can be bent in a preferential direction even in an unstressed basic state, so that it is U-shaped, for example. The strain gauge 20 shown additionally has a rounded holding portion 27, which adjoins the connecting portion 24 on the other side of the solder pad 25 and is designed for temporarily holding the connecting portion 24 on the electrical component 3. For that purpose, the holding portion 27, as shown here, can have a central through-bore 29, or alternatively an indentation, into which an instrument for holding the strain gauge 20 on the electrical component 3 can be introduced. For that purpose, the holding portion 27 can further also or only be self-adhesive.

The invention claimed is:

1. A torque sensor having a base body which extends in a radial direction of the base body from an annular inner flange having first force application points, via a mechanically weakened sensor portion equipped with measurement transducers which generate output signals, to an annular outer flange having second force application points,
wherein a rubber-elastic sealing membrane arranged axially between the outer flange and the inner flange covers the mechanically weakened sensor portion in a fluid-tight manner, wherein the sealing membrane is located axially between the second force application points and the mechanically weakened sensor portion.

2. The torque sensor as claimed in claim 1, wherein the sealing membrane is clamped to the torque sensor or adhesively bonded thereto.

3. The torque sensor as claimed in claim 2, wherein the sealing membrane is attached to at least one of the outer flange and the inner flange of the torque sensor.

4. The torque sensor as claimed in claim 1, wherein the sealing membrane comprises a disk-shaped annular membrane.

5. The torque sensor as claimed in claim 1, wherein the sealing membrane is a molded rubber part, a turned rubber part, or a rubber part produced by water-jet machining.

6. The torque sensor as claimed in claim 1, wherein the sealing membrane has a modulus of elasticity which is lower than that of the base body by at least a factor of $10^2$.

7. The torque sensor as claimed in claim 6, wherein the modulus of elasticity of the sealing member is lower than that of the base body by a factor of from $10^3$ to $10^5$.

8. The torque sensor as claimed in claim 6, wherein the modulus of elasticity of the sealing member is lower than that of the base body by a factor of from $10^4$ to $10^5$.

9. The torque sensor as claimed in claim 1, wherein the measurement transducers are strain gauges which have a measurement grid portion connected to the base body and a free connecting portion which adjoins the measurement grid portion and has at least one electrical connection point.

10. The torque sensor as claimed in claim 9, wherein a holding portion adjoins the connecting portion on the other side of the at least one connecting point, which holding portion is configured to temporarily hold the connecting portion on an electrical component.

\* \* \* \* \*